(12) United States Patent
Lakshmanan et al.

(10) Patent No.: US 10,528,342 B2
(45) Date of Patent: Jan. 7, 2020

(54) FUNCTION TRACKING FOR SOURCE CODE FILES

(71) Applicant: Western Digital Technologies, Inc., San Jose, CA (US)

(72) Inventors: Nachammai Lakshmanan, Bangalore (IN); Vijayprasad Srinivasan, Bangalore (IN); Gopinath Munusamy, Bangalore (IN); Vidyavachaspathi Kabbinale, Bangalore (IN); Basavaraj Kamadinni, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 60 days.

(21) Appl. No.: 15/785,073

(22) Filed: Oct. 16, 2017

(65) Prior Publication Data

US 2019/0114166 A1  Apr. 18, 2019

(51) Int. Cl.
*G06F 9/44* (2018.01)
*G06F 8/71* (2018.01)
(Continued)

(52) U.S. Cl.
CPC .................. *G06F 8/71* (2013.01); *G06F 8/77* (2013.01); *G06F 16/13* (2019.01); *G06F 16/48* (2019.01); *G06F 17/2288* (2013.01); *G06F 21/64* (2013.01)

(58) Field of Classification Search
CPC .......... G06F 11/3676; G06F 8/71; G06F 8/20; G06F 8/51; G06F 8/73; G06F 21/6236;
(Continued)

(56) References Cited

U.S. PATENT DOCUMENTS 5,278,979 A *  1/1994  Foster ....................... G06F 8/71
8,352,445 B2    1/2013  Begel et al.
(Continued)

FOREIGN PATENT DOCUMENTS

JP    2013131002 A    7/2013
WO    2009076010 A1    6/2009

OTHER PUBLICATIONS

David Abrahams, "Generic Programming Techniques", Boost C++ Libraries, 2001, pp. 1-6, available at http://www.boost.org/community/generic_programming.html.
(Continued)

*Primary Examiner* — Tuan A Vu
(74) *Attorney, Agent, or Firm* — Barry IP Law P.C.

(57) ABSTRACT

Tracking a function in a source code file includes determining an author of an initial version of the source code file, and generating a data structure for one or more functions in the initial version. The determined author is associated as a function author of the one or more functions. In response to a new version of the source code file being committed, one or more added or changed functions are identified, and an author of the new version of the source code file is determined. The data structure for each changed function is updated to associate the author of the new version of the source code file as the function author for a new version of the changed function, and a new data structure is generated for each added function associating the author of the new version as a function author of the added function.

20 Claims, 14 Drawing Sheets

(51) Int. Cl.
*G06F 8/77* (2018.01)
*G06F 16/13* (2019.01)
*G06F 16/48* (2019.01)
G06F 21/64 (2013.01)
G06F 17/22 (2006.01)

(58) Field of Classification Search
CPC .. G06F 12/0246; G06F 16/986; G06F 9/3844; G06F 3/0641; G06F 11/3608; G06F 16/2228; G06F 17/2288; G06F 21/64; G06F 21/604; G06F 16/48
See application file for complete search history.

(56) References Cited

U.S. PATENT DOCUMENTS

| | | | |
|---|---|---|---|
| 8,375,361 B2 | 2/2013 | Bell et al. | |
| 8,495,100 B2 | 7/2013 | Cheung | |
| 8,589,349 B2 | 11/2013 | Grant et al. | |
| 9,430,229 B1* | 8/2016 | Van Zijst | G06F 9/3844 |
| 9,477,461 B1* | 10/2016 | Korotaev | G06F 16/2228 |
| 2003/0069907 A1* | 4/2003 | Moreau | G06F 16/986 |
| | | | 715/234 |
| 2005/0160395 A1* | 7/2005 | Hughes | G06F 8/20 |
| | | | 717/102 |
| 2005/0262107 A1 | 11/2005 | Bergstraesser et al. | |
| 2007/0250810 A1* | 10/2007 | Tittizer | G06F 8/73 |
| | | | 717/110 |
| 2009/0006420 A1* | 1/2009 | Morrill | G06F 21/6236 |
| 2010/0161685 A1* | 6/2010 | Jain | G06F 3/0641 |
| | | | 707/812 |
| 2012/0272151 A1 | 10/2012 | Grossman et al. | |
| 2013/0080997 A1* | 3/2013 | Dattathreya | G06F 8/71 |
| | | | 717/121 |
| 2013/0254746 A1* | 9/2013 | Balakrishnan | G06F 11/3608 |
| | | | 717/124 |
| 2013/0290266 A1 | 10/2013 | Kapoor | |
| 2013/0326215 A1 | 12/2013 | Leggette et al. | |
| 2014/0229910 A1* | 8/2014 | Frenkiel | G06F 8/51 |
| | | | 717/104 |
| 2016/0034273 A1* | 2/2016 | Leupold | G06F 8/71 |
| | | | 717/122 |
| 2016/0048487 A1 | 2/2016 | Briggs et al. | |
| 2016/0299835 A1* | 10/2016 | Jain | G06F 11/3676 |
| 2018/0173619 A1* | 6/2018 | Sivasankaran | G06F 12/0246 |

OTHER PUBLICATIONS

"Generic programming", from Wikipedia, the free encyclopedia, last edited on Oct. 12, 2017, pp. 1-22, available at http://en.wikipedia.org/wiki/Generic_programming.

Toth et al., "Using Version Control History to Follow the Changes of Source Code Elements", 2013 17th European Conference on Software Maintenance and Reengineering, 2013 IEEE, pp. 319-322.

"Self (programming language)", from Wikipedia, the free encyclopedia, last edited on Jul. 27, 2017, pp. 1-9, available at https://en.wikipedia.org/wiki/Self_(programming_language).

Bendix et al., "CoEd—A Tool for Cooperative Development of Hierarchical Documents", Department of Computer Science, Aalborg University, Denmark, 1998, pp. 1-10.

Collins-Sussman et al., "Version Control with Subversion", 2011, available at http://svnbook.red-bean.com/en/1.7/svn-book.html.

* cited by examiner

Source File - operations.c (Version 1)

```
1.  line of code
2.  line of code
3.  line of code
4.  line of code
5.  void printSum(int a, int b){
6.  int sum = a + b;
7.  printf("Sum = %d", sum);
8.  }
9.  void printDiff(int a, int b){
10. int diff = a - b;
11. printf("Difference = %d", diff);
12. }
13. line of code
14. line of code
```

FIG. 11A

Source File - operations.c (Version 2)

```
1.  line of code
2.  line of code
3.  line of code
4.  line of code
5.  void printSum(int a, int b){
6.  int sum = a + b;
7.  printf("%d + %d = %d", a,b,sum);
8.  printf("which means sum of %d and %d =", a, b, sum);
9.  printf(" + is the operator which performs sum");
10. }
11. void printDiff(int a, int b){
12. int diff = a - b;
13. printf("Difference = %d", diff);
14. }
15. void printProduct(int a, int b){
16. int product = a * b;
17. printf("Product = %d", product);
18. }
19. line of code
20. line of code
```

FIG. 11B

Source File - operations.c (Version 3)

```
1.  line of code lines of code
2.  line of code lines of code
3.  line of code lines of code
4.  line of code lines of code
5.  void printDiff(int a, int b){
6.  int diff = a - b;
7.  printf("Difference = %d", diff);
8.  }
9.  void printProduct(int a, int b){
10. int product = a * b;
11. printf("Product = %d", product);
12. }
13. line of code lines of code
14. line of code lines of code
```

FIG. 11C

| File Version | Time Stamp | Author |
|---|---|---|
| 1 | TS1 | Tom |
| 2 | TS2 | Jack |
| 3 | TS3 | Mary |

FIG. 12

| Version | Parser Output | | | | | | Function ID Generator Output |
|---|---|---|---|---|---|---|---|
| Version 1 (v1) | | | | | | | |
| | Function Name | Return Type | Number Of Parameters | Order &Type of Parameters | Start Line | End Line | Function Unique ID |
| | printSum | void | 2 | param0 - int<br>param1 - int | 5 | 8 | FID_1 |
| | printDiff | void | 2 | param0 - int<br>param1 - int | 9 | 12 | FID_2 |
| Version 2 (v2) | | | | | | | |
| | Function Name | Return Type | Number Of Parameters | Order &Type of Parameters | Start Line | End Line | Function Unique ID |
| | printSum | void | 2 | param0 - int<br>param1 - int | 5 | 10 | FID_1 |
| | printDiff | void | 2 | param0 - int<br>param1 - int | 11 | 14 | FID_2 |
| | printProduct | void | 2 | param0 - int<br>param1 - int | 15 | 18 | FID_3 |
| Version 3 (v3) | | | | | | | |
| | Function Name | Return Type | Number Of Parameters | Order &Type of Parameters | Start Line | End Line | Function Unique ID |
| | printDiff | void | 2 | param0 - int<br>param1 - int | 5 | 8 | FID_2 |
| | printProduct | void | 2 | param0 - int<br>param1 - int | 9 | 12 | FID_3 |

FIG. 13

| File Version | Function ID | Time Stamp | Last Author | Function Code Changes | Addtional Logs |
|---|---|---|---|---|---|
| v1 | FID_1 | TS1 | Tom | +++ void printSum(int a, int b){<br>+++   int sum = a + b;<br>+++   printf("Sum = %d", sum);<br>+++ } | None |
|  | FID_2 | TS1 | Tom | +++ void printDiff(int a, int b){<br>+++   int diff = a - b;<br>+++   printf("Difference = %d", diff);<br>+++ } | None |
| v2 | FID_1 | TS2 | Jack | void printSum(int a, int b){<br>int sum = a + b;<br>---   printf("Sum = %d", sum);<br>+++   printf("%d + %d = %d", a,b,sum);<br>+++   printf("which means sum of %d and %d =", a, b, sum);<br>+++   printf(" + is the operator which performs sum");<br>} | None |
|  | FID_2 | TS1 | Tom | void printDiff(int a, int b){<br>int diff = a - b;<br>printf("Difference = %d", diff);<br>} | None |
|  | FID_3 | TS2 | Jack | +++ void printProduct(int a, int b){<br>+++   int product = a * b;<br>+++   printf("Product = %d", product);<br>+++ } | None |
| v3 | FID_1 | TS3 | Mary | --- void printSum(int a, int b){<br>---   int sum = a + b;<br>---   printf("%d + %d = %d", a,b,sum);<br>---   printf("which means sum of %d and %d =", a, b, sum);<br>---   printf(" + is the operator which performs sum");<br>---} | Operation: Move<br>Destnfile: sumCalculation.c<br>DestnFUID: FID_5 |
|  | FID_2 | TS1 | Tom | void printDiff(int a, int b){<br>int diff = a - b;<br>printf("Difference = %d", diff);<br>} | None |
|  | FID_3 | TS2 | Jack | void printProduct(int a, int b){<br>int product = a * b;<br>printf("Product = %d", product);<br>} | None |

FIG. 14

Source Code File -sumCalculation.c (Version 1)

```
1.  line of code
2.  line of code
3.  line of code
4.  line of code 5.  void printSumThreeNumbers(int a, int b,
    int c)
6.  {
7.  printSum(a, b+c);
8.  }

9.  line of code
10. line of code
```

FIG. 15A

Source Code File -sumCalculation.c (Version 2)

```
1.  line of code
2.  line of code
3.  line of code
4.  line of code 5.  void printSumThreeNumbers(int a, int b,
    int c)
6.  {
7.  printSum(a, b+c);
8.  }

9.  line of code
10. line of code 11. void printSum(int a, int b){
12. int sum = a + b;
13. printf("%d + %d", a,b,sum);
14. printf("which means sum of %d and %d
    =", a, b, sum);
15. printf(" + is the operator which
    performs sum");
16. }
```

FIG. 15B

Function Logs For Destination Source Code File sumCalculation.c

| File Version | Function ID | Time Stamp | Last Author | Function Code Changes | Addtional Logs |
|---|---|---|---|---|---|
| v1 | FID_4 | TS4 | Tim | +++ void printSumThreeNumbers(int a, int b, int c)<br>+++ {<br>+++ printSum(a, b+c);<br>+++ } | None |
| v2 | FID_4 | TS4 | Tim | void printSumThreeNumbers(int a, int b, int c)<br>{<br>printSum(a, b+c);<br>} | None |
|  | FID_5 | TS5 | Mary | +++void printSum(int a, int b){<br>+++int sum = a + b;<br>+++printf("%d + %d = %d", a,b,sum);<br>+++printf("which means sum of %d and %d =", a, b, sum);<br>+++printf(" + is the operator which performs sum");<br>} | Operation: Move<br>Src FUID: FID_1<br>Copy of Src FUID logs: as in FIG. 17 |

FIG. 16

| Time Stamp | Last Author | Function Code Changes | Addtional Logs |
|---|---|---|---|
| TS1 | Tom | +++ void printSum(int a, int b){<br>+++ int sum = a + b;<br>+++ printf("Sum = %d", sum);<br>+++ } | None |
| TS2 | Jack | void printSum(int a, int b){<br>int sum = a + b;<br>---printf("Sum = %d", sum)<br>+++printf("%d + %d", a,b,sum);<br>+++printf("which means sum of %d and %d<br>  =", a, b, sum);<br>+++printf(" + is the operator which<br>  performs sum");<br>} | None |

FIG. 17

Version 1 of sumFunction.c

```
1.  lines of code
2.  lines of code
3.  lines of code
4.  lines of code 5.  void printSum(int a, int b){
6.  int sum = a + b;
7.  printf("Sum = %d", sum);
8.  }

9.  #ifdef EQUATION
10. void printSum(int a, int b,){
11. int sum = a + b;
12. printf("%d + %d = %d",a,b,sum);
13. }
14. #endif 15. lines of code
16. lines of code
17. lines of code
18. lines of code
```

FIG. 18A

Version 2 of sumFunction.c

```
1.  lines of code
2.  lines of code
3.  lines of code
4.  lines of code

5.  #ifdef EQUATION
6.  void printSum(int a, int b){
7.  int sum = a + b;
8.  printf("%d + %d = %d",a,b,sum);
9.  }
10. #endif 11. void printSum(int a, int b){
12. int sum = a + b;
13. printf("Sum = %d", sum);
14. }

15. lines of code
16. lines of code
17. lines of code
18. lines of code
```

FIG. 18B

| Version | Parser Output | | | | | | | Function ID Generator Output |
|---|---|---|---|---|---|---|---|---|
| Version 1 (v1) | Function Name | Return Type | No. Of Params | Order &Type of Parameters | Start Line | End Line | Rank | Function Unique ID |
| | printSum | void | 2 | param0 - int<br>param1 - int | 5 | 8 | 1 | FID_1 |
| | printSum | void | 2 | param0 - int<br>param1 - int | 9 | 12 | 2 | FID_2 |
| Version 2 (v2) | Function Name | Return Type | No. Of Params | Order &Type of Parameters | Start Line | End Line | Rank | Function Unique ID |
| | printSum | void | 2 | param0 - int<br>param1 - int | 6 | 9 | 1 | FID_1 |
| | printSum | void | 2 | param0 - int<br>param1 - int | 11 | 14 | 2 | FID_2 |

FIG. 19

| File Version | Function ID | Time Stamp | Last Author | Function Code Changes | Addtional Logs |
|---|---|---|---|---|---|
| v1 | FID_1 | TS1 | Tom | `+++ void printSum(int a, int b){`<br>`+++   int sum = a + b;`<br>`+++   printf("Sum = %d", sum);`<br>`+++ }` | None |
| | FID_2 | TS1 | Tom | `+++ void printSum(int a, int b){`<br>`+++   int sum = a + b;`<br>`+++   printf("%d + %d = %d",a,b,sum);`<br>`+++ }` | None |
| v2 | FID_1 | TS2 | Jack | `    void printSum(int a, int b){`<br>`      int sum = a + b;`<br>`---   printf("Sum = %d", sum);`<br>`+++   printf("%d + %d = %d",a,b,sum);`<br>`    }` | None |
| | FID_2 | TS1 | Jack | `    void printSum(int a, int b){`<br>`      int sum = a + b;`<br>`---   printf("%d + %d = %d",a,b,sum);`<br>`+++   printf("Sum = %d", sum);`<br>`    }` | None |

FIG. 20

FUNCTION TRACKING FOR SOURCE CODE FILES

BACKGROUND

Program files or source code files typically include one or more functions, which can include lines of code to perform a task, procedure, or routine when executed. During software development, users such as programmers may modify files using Code Management Software (CMS) that can include a software versioning system, source control system, or revision control system. Some examples of CMS can include Apache Subversion (SVN), Git, Microsoft Team Foundation Server (TFS), Helix VCS, Mercurial, or IBM Rational ClearCase. Such CMS can usually track changes made in a file, which can be especially useful when coordinating software development among a group of users. The CMS may also provide information about the file such as a last author for a latest version of the file.

In order to determine changes made to a particular function within a file, a user typically must perform a diff operation in the CMS to compare all of the lines of code in two different versions of the file. The user then manually filters or reads through the diff results to attempt to identify any changes made to a particular function. However, such identification of function changes is usually a tedious and error prone process. In some cases, a function may be significantly changed, relocated from one area of the file to another area, or moved to a different file altogether. Each of these examples may make it very difficult for a user to follow the same function to determine what was changed in the function. It may also be difficult for a user to determine who made which changes to the function or who may have made intermediate changes between the versions being compared, since conventional CMS generally tracks authors and changes at the file level.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 11A is an example of an initial version of a source code file according to an embodiment.

FIG. 11B is an example of a second version of the source code file of FIG. 11A.

FIG. 11C is an example of a third version of the source code file of FIGS. 11A and 11B after a function has been moved.

FIG. 12 is an example of a file log for the source code file of FIGS. 11A to 11C.

FIG. 13 is an example of output from a parser and Function Identifier (FID) generator for the source code file of FIGS. 11A to 11C according to an embodiment.

FIG. 14 is an example of function logs for the source code file of FIGS. 11A to 11C according to an embodiment.

FIG. 15A is an example of an initial version of a destination source code file according to an embodiment.

FIG. 15B is an example of a second version of the destination source code file of FIG. 15A after a function is moved from the source code file of FIG. 11B into the destination source code file.

FIG. 16 is an example of function logs for the destination source code file of FIGS. 15A and 15B.

FIG. 17 is an example of an additional function log in the destination source code file for the function moved into the destination source code file of FIG. 15B according to an embodiment.

FIG. 18A is an example of an initial version of a source code file with matching function prototypes according to an embodiment.

FIG. 18B is an example of a second version of the source code file of FIG. 18A after functions with matching function prototypes have been reordered according to an embodiment.

FIG. 19 is an example of output from a parser and FID generator for the versions of the source code file in FIGS. 18A and 18B according to an embodiment.

FIG. 20 is an example of function logs for the source code file of FIGS. 18A and 18B according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environments

Figure 1:
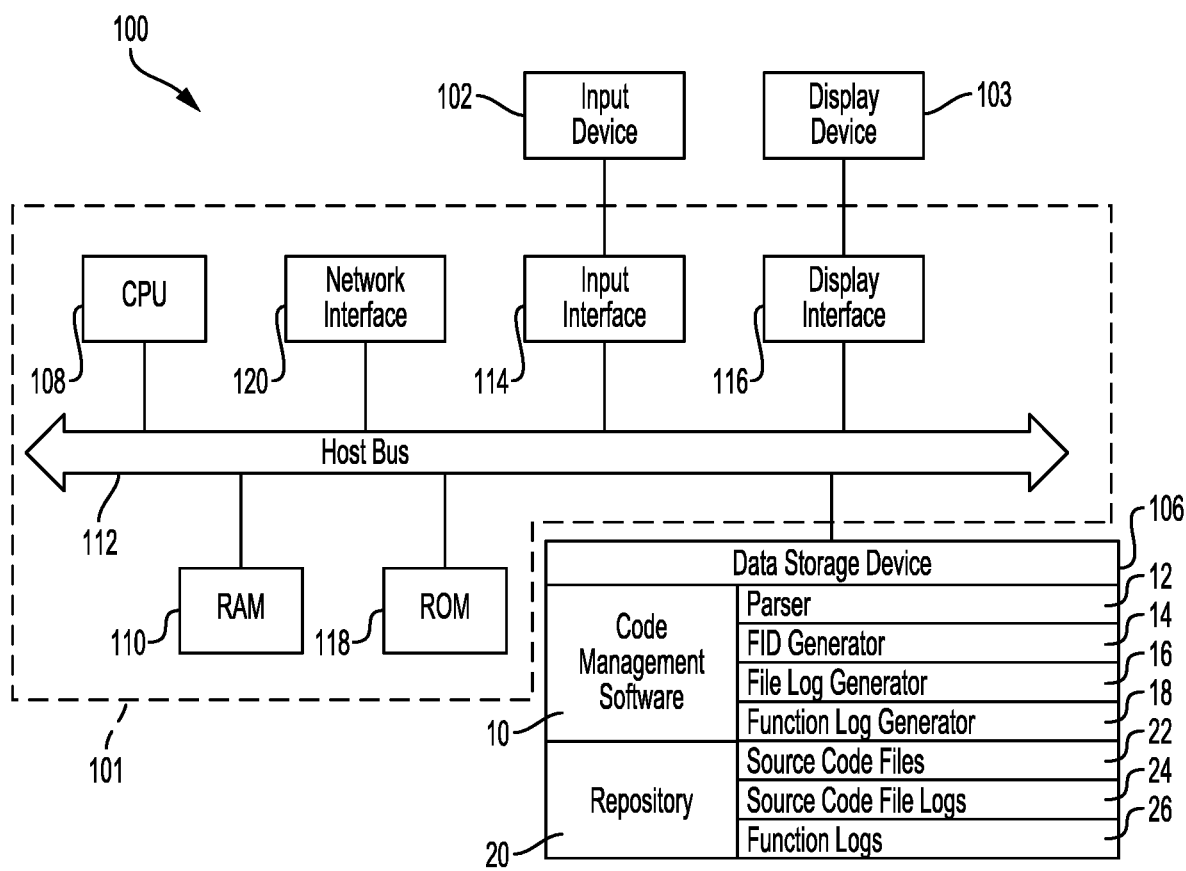
FIG. 1 is a block diagram of an example computer system according to an embodiment.

FIG. 1 shows an example computer system 100 that includes host 101, input device 102, display device 103, and Data Storage Device (DSD) 106. Computer system 100 can be, for example, a personal computer, laptop, tablet, server, or other electronic device. In this regard, computer system 100 may be a stand-alone system or part of a network, as in the example environment of FIG. 2.

Input device 102 can include, for example, a keyboard, scroll wheel, or pointing device allowing a user of computer system 100 to enter information and commands to computer system 100, or to allow a user to manipulate objects displayed on display device 103. In some implementations, input device 102 and display device 103 can be combined into a single component, such as a touch-screen that displays objects and receives user input.

In FIG. 1, host 101 includes Central Processing Unit (CPU) 108 which can be implemented using one or more processors for executing instructions including a microcontroller, a Digital Signal Processor (DSP), an Application Specific Integrated Circuit (ASIC), a System on a Chip (SoC), a Field Programmable Gate Array (FPGA), hardwired logic, analog circuitry and/or a combination thereof. CPU 108 interfaces with host bus 112. Also interfacing with host bus 112 are Random Access Memory (RAM) 110, input interface 114 for input device 102, display interface 116 for display device 103, Read Only Memory (ROM) 118, network interface 120 and DSD 106.

RAM 110 interfaces with host bus 112 so as to provide information stored in RAM 110 to CPU 108 during execution of instructions in software programs such as Code Management Software (CMS) 10. More specifically, CPU 108 loads computer-executable instructions from DSD 106 or another data storage device into a region of RAM 110. CPU 108 can then execute the stored process instructions from RAM 110. Data such as data to be stored in DSD 106 or data retrieved from DSD 106 can be stored in RAM 110 so that the data can be accessed by CPU 108 during execution of software programs to the extent that such software programs need to access and/or modify the data.

DSD 106 stores CMS 10, which can include a software versioning system, source control system, or revision control system that allows users to track changes made in a file, such as when coordinating software development among a group of users. CMS 10 may provide information about the file such as a last author for a latest version of the file or an indication of when the file was last committed or saved. As discussed in more detail below, CMS 10 includes modules such as parser 12, Function Identifier (FID) generator 14, file log generator 16, and function log generator 18 that allow for the tracking of function authors and/or changes made to functions within a file, such as a source code file.

In addition, DSD 106 in the example of FIG. 1 stores repository 20, which can serve as a local repository for storing data related to CMS 10. As shown in FIG. 1, repository 20 includes source code files 22, source code file logs 24, and function logs 26. Examples of such data are discussed in more detail below with reference to FIGS. 11A to 20. With respect to function logs 26, each function log may be a separate data structure that is generated for respective functions in a source code file. In other implementations, function logs 26 may be combined into a single data structure including data structures for respective functions.

As will be appreciated by those of ordinary skill in the art, other implementations may include different data or a different arrangement of modules or data than those shown in FIG. 1. For example, source code files 22 may include source code file logs 24 and functions logs 26, or CMS 10 may include additional modules, such as a diff module for performing diff operations to compare lines of code, a backup module for backing up a file, or a module for synchronizing the checking in or checking out of files from a repository.

As discussed with reference to FIG. 2 below, computer system 100 may communicate via a network (e.g., network 30 in FIG. 2) using network interface 120 to make changes in a remote repository located on a remote server or in a different computer system. Network interface 120 may communicate using a standard, such as, for example, Ethernet or WiFi, or a bus standard such as Serial Advanced Technology Attachment (SATA), PCI express (PCIe), Small Computer System Interface (SCSI), or Serial Attached SCSI (SAS).

Those of ordinary skill in the art will appreciate that the disclosed function tracking processes may be implemented in other environments. In some implementations, computer system 100 can include more or less than those elements shown in FIG. 1. For example, computer system 100 may not include a local repository 20 and may make changes directly on a repository stored on a remote server, such as a cloud server. As another example, some implementations may remotely access CMS via a web browser rather than execute a local CMS.

Figure 2:
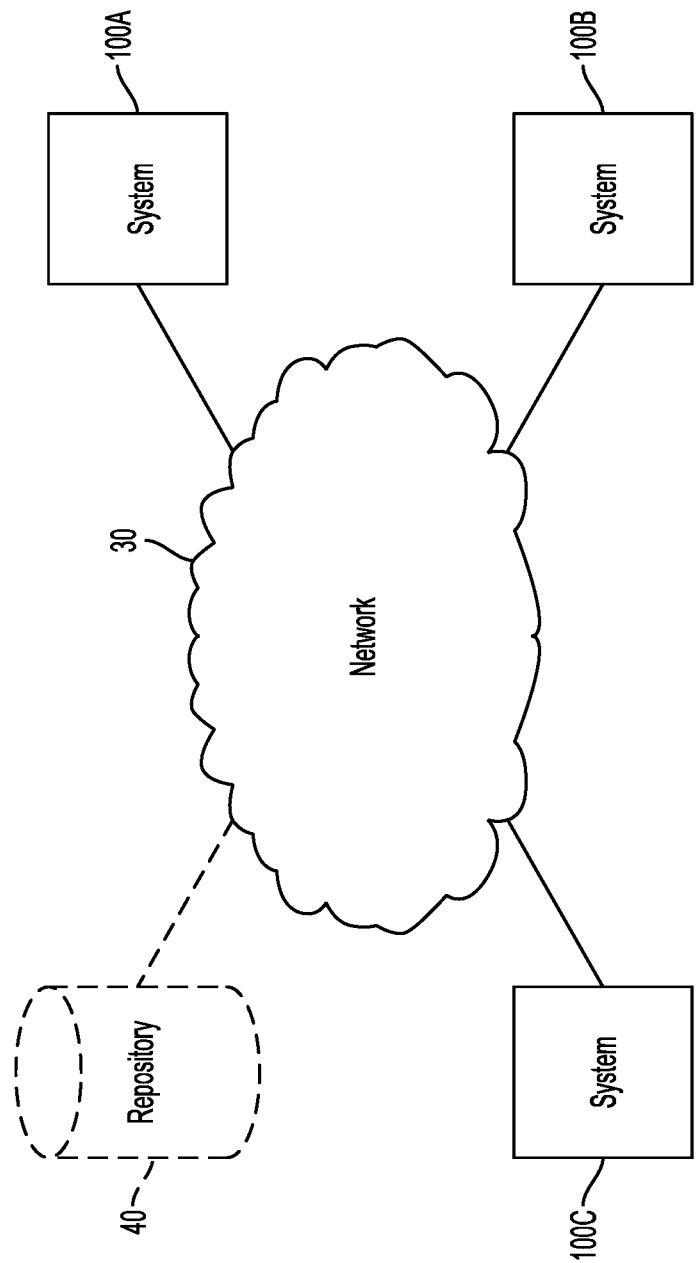
FIG. 2 is a diagram for a client-server environment or a distributed environment according to an embodiment.

FIG. 2 is a diagram for a client-server environment or a distributed environment according to an embodiment. As will be appreciated by those of ordinary skill in the art, other implementations of a client-server environment or a distributed environment may include a different number of computer systems or repositories than shown in the example of FIG. 2.

In FIG. 2, computer systems 100A, 100B, and 100C are connected to network 30, which may include, for example, a Local Area Network (LAN) or a Wide Area Network (WAN) such as the Internet. Each of systems 100A to 100C can include a computer system similar to computer system 100 in FIG. 1 to allow a user or programmer at each system 100 to contribute, edit, track, or modify a source code file that may optionally be stored at a central location such as repository 40 in a client-server implementation, or at one or more repositories located at repository 40 and/or at computer systems 100 in a distributed implementation.

Repository 40 may include a server connected to network 30 that allows each of systems 100A to 100C to act as clients that can check out a source code file to make changes to the source code files stored in repository 40, and check in the source code file after changes have been committed by a user. In such a server-client environment, each of computer systems 100A to 100C may also store local copies of the repository (e.g., repository 20 in FIG. 1) or portions of repository 40 that may include a working copy of a source code file, source code file logs, or function logs before being committed to repository 40.

In some distributed implementations, repository 40 is optional as indicated by the dashed lines in FIG. 2. Computer systems 100A to 100C may act as peers that can make changes to a source code file and accept changes in versions of source code files pulled from another computer system. Such distributed implementations may also include centralized repository 40 for storing stable versions or a backups of source code files.

As noted above, identifying changes made to a particular function within a source code file or determining who made certain changes to a function can be a tedious and error prone process using a conventional CMS. This sort of function tracking using a conventional CMS can involve, for example, performing a diff operation on an entire file and then manually attempting to follow changes made to a function by different users or authors. This can be particularly problematic or impossible when tracking a function that has been significantly changed and/or relocated from one area of a file to another area of the same file, or moved to an entirely different file. It may also be extremely difficult or impossible to determine who made specific changes to some functions but not to other functions, since conventional CMS only tracks authors at the file level.

As used herein, a function can be thought of as a defined portion of a program or source code file for performing a particular task, procedure, or routine. Examples of some functions are provided with reference to the source code files in FIGS. 11A, 11B, 11C, 15A, 15B, 18A, and 18B discussed below. Despite the examples used in the present disclosure to describe certain function tracking processes, the examples of source code files and functions discussed below are not to be seen as limiting the present disclosure to any particular programming language, type of file, or type of function.

Example Processes and Data Structures

Figure 3:
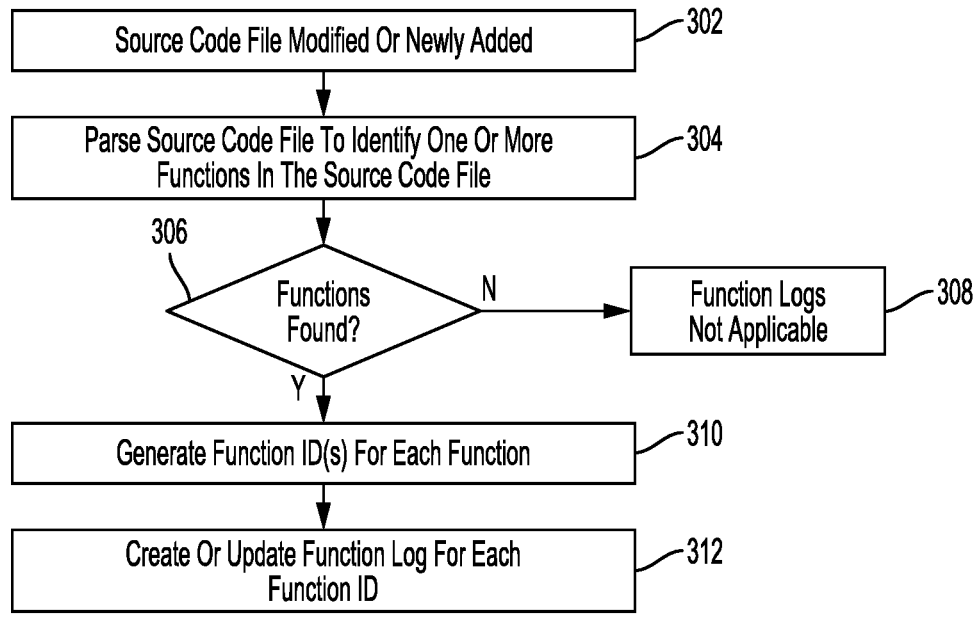
FIG. 3 is a flowchart for a function log generation process according to an embodiment.

FIG. 3 is a flowchart for a function log generation process according to an embodiment. The process of FIG. 3 may be performed by a processor, such as CPU 108 in FIG. 1, executing CMS 10.

In block 302, a source code file, such as one of source code files 22 in FIG. 1, is modified or newly added to a repository. The modification may be the result of a user of a computer system changing the source code file by, for example, adding or removing code from the source code file, or moving or copying portions of the file to another file. In some implementations, the process of FIG. 3 may be triggered when a file is committed to a repository, such as repository 20 in FIG. 1 or repository 40 in FIG. 2.

In block 304, parser 12 parses the source code file to identify one or more functions in the source code file. Parser 12 may include or reference one or more programming language libraries that allow it to identify particular function names and/or a programming language syntax within a source code file. In some implementations, parser 12 may identify a function prototype, and start and end lines for the function within the source code file. In such implementations, parser 12 may receive the source code file as an input and generate a parser output, which can include a list of function prototypes for the functions identified in the source code file. In some implementations, parser 12 in block 304 may also initially check a file extension of the file to determine whether or not the file type is one that includes functions before proceeding with parsing the file to identify functions.

A function prototype can include, for example, a function name, a return type returned by the function, a number of parameters input to the function, and an order of the parameters. An example of a parser output is shown in FIG. 13, which provides examples for each of these portions of a function prototype with reference to the different versions of the source code file in FIGS. 11A to 11C. In this example, the function names include printSum, printDiff, and print-Product. The return types for the functions identified by the parser are void. For each function, there are two parameters, a and b, which are integer values. A parameter type for these parameters are also shown in the parser output as param0-int and param1-int in their order of appearance in the different versions of the source code file of FIGS. 11A to 11C. In addition, the start and end lines of each function are provided in the parser output.

Returning to FIG. 3, CPU 108 in block 306 determines whether any functions were found in the source code file. If not, the process ends in block 308 since there are no functions to track or log. On the other hand, if functions are determined to have been found in block 306, FID generator 14 of CMS 10 in block 310 generates an FID for each identified function. The FID can be an identifier for uniquely identifying a function across different versions of the source code file, and even across different source code files.

In some implementations, a unique FID can be generated as a hash value derived from a path where the source code file is stored in a repository and the function prototype or portions of the function prototype. For example, an absolute path of the source code file stored in a centralized repository, such as repository 40 in FIG. 2, can be used with a function prototype for the function to generate a hash value as a unique FID. This FID can then be used to identify the function across different versions of the source code file, even if the function is removed and later added back in. Accordingly, when portions of the function prototype change, such as when parameters are added or removed or the order of parameters changes, a new FID may be generated based on the changed function prototype. The new FID would appear in a new function log for a new function, and the function log for the old FID would indicate the removal of the old function.

In block 312, function log generator 18 of CMS 10 creates a new function log for each new FID for the source code file or updates an existing function log for FIDs already included with the source code file. In some implementations, the function logs may include a list of FIDs for all functions that have appeared in all previous versions of the source code file. In addition, the function logs may also be included with the source code file or may be stored separately from the source code files as shown in FIG. 1.

The function logs can also provide an indication of an author that made changes to a particular function, and the changes made to the function from one or more previous versions of the function. Examples of function logs are shown in FIGS. 14, 16, and 20. As shown in these examples, a function log can include a file version, an FID, a timestamp of when a change was committed, a corresponding author who made the change, a listing of what was added or removed (e.g., lines with "+++" or "---" in the function code changes column), and additional logs that may be used for functions that have been copied or moved as discussed in more detail below with reference to the function copy or function move process of FIG. 8 and the additional log example of FIGS. 16 and 17.

In some implementations, the parser output generated in block 304 of FIG. 3 may also include a rank for the function, as shown in the parser output of FIG. 19 for the versions of the source code file shown in FIGS. 18A and 18B. The rank may indicate an order in which functions having the same function name or prototype appear in the source code file. As shown in the example of FIGS. 18A and 18B, a user has swapped the printSum function in lines 5 to 8 in the initial version of the source code file with the printSum function in lines 11 to 14 in the second version of the source code file. In the parser output of FIG. 19, the first printSum function in version 1 is provided a rank of 1 and the second printSum function in version 2 is provided a rank of 2.

When generating an FID in block 310 of FIG. 3, the rank may be used as part of the function prototype to uniquely identify or distinguish between the two printSum functions. In the example parser output of FIG. 19, the first appearing function in both versions of the file is provided a rank of 1 and therefore has the same FID (i.e., FID_1) since the other portions of the function prototype (i.e., function name, return type, number of parameters, and order of parameters) remain the same and the path for the file is assumed to remain the same.

Continuing with this example of using rank, FIG. 20 provides example function logs for the two versions of the source code file in FIG. 19. As shown in the second version of FID_1 in FIG. 20, swapping the order of the functions in FIG. 18A to the order shown in FIG. 18B results in function code changes showing the removal of "printf("Sum=% d", sum);" from FID_1 and the addition of "printf(% d+% d=% d, a,b.sum);". FID_2 in version 2 corresponding to the file in FIG. 18B shows the opposite changes, thereby accounting for the swapping or relocation of the functions in the function logs.

Figure 4:
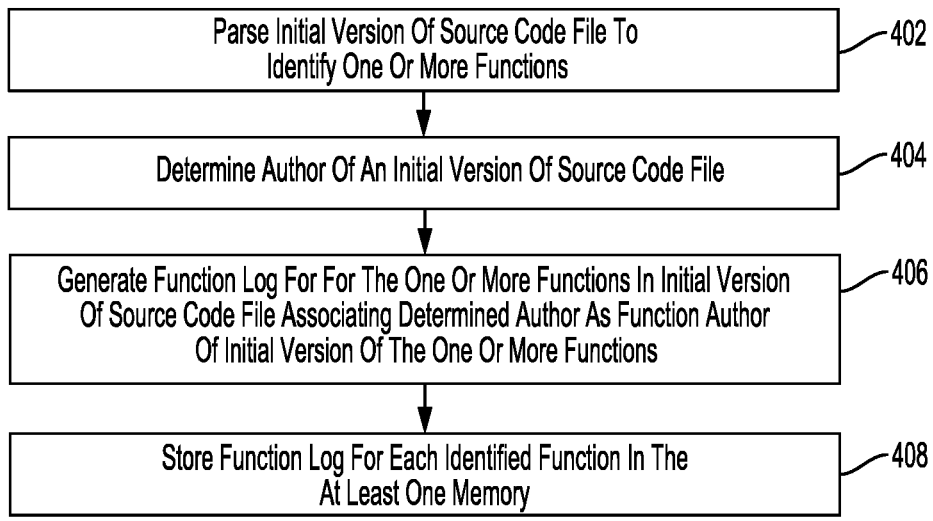
FIG. 4 is a flowchart for an initial function log generation process according to an embodiment.

FIG. 4 is a flowchart for an initial function log generation process according to an embodiment. The process of FIG. 4 may be performed by a processor, such as CPU 108 in FIG. 1, executing CMS 10.

In block 402, parser 12 parses an initial version of a source code file to identify one or more functions. The initial version of the source code file can be a new source code file committed to a repository by a user. As discussed above with reference to block 304 of FIG. 3, parser 12 may use one or more programming libraries to identify a function prototype. In such implementations, parser 12 may receive the source code file as an input and generate a parser output, which can include a list of function prototypes for the functions identified in the source code file. The parser output may also include start and end lines for each function in the source code file. In some cases, parser 12 can also initially check a file extension of the file to determine whether or not the file type is one that includes functions before proceeding with identifying functions. This can ordinarily save time and processing resources by avoiding the parsing of a file that will not include any functions.

In block 404, CMS 10 determines an author of an initial version of the source code file. In some implementations, CMS 10 may access at least one memory for an indication of the author for the initial version of the source code file. The indication of the author may be included with a source code file log included with the file or stored apart from the file. For example, CMS 10 in block 404 may access a source code file log 24 from a repository stored in a memory, such as from repository 20 in DSD 106 of FIG. 1. In other examples, the source code file log may be stored as part of the source code file or may be stored in a centralized repository, such as repository 40 in FIG. 2, or in another remote repository at a different computer system.

An example of a source code file log is shown in FIG. 12, with indications of file versions, timestamps, and indications of authors associated with each version and the corresponding timestamp. As shown in FIG. 12, different authors or users have committed or saved different versions of the file at different times. With respect to the initial function log generation process of FIG. 4, the author of the initial or first version of the source code file would be Tom since he is indicated in FIG. 12 as the author of the first version of the file. The source code file log may be generated by file log generator 16 of CMS 10, which can update the source code file log each time a new version the file is committed to a repository.

Returning to the process of FIG. 4, function log generator 18 or another portion of CMS 10 in block 406 generates a function log for the one or more functions in the initial version of the source code file associating the determined author as a function author of an initial version of each function identified in block 402. With reference to the example function logs of FIG. 14, an initial version of the source code file from FIG. 11A is shown in the top portion of the function log as file version v1. As shown in FIG. 14, there are two functions in the first version of the file that have been identified with FID_1 and FID_2. The function author for both functions in the initial version is Tom at timestamp TS1, which corresponds to the author of the first version of the source code file in the source code file log in FIG. 12. In other implementations, the function logs of FIG. 14 may be organized differently or include different information. For example, other function logs may be organized by FID rather than by file versions, or otherwise sortable by a user.

The function log for each identified function is stored in at least one memory in block 408. In the example of FIG. 1, the function logs may be stored as function logs 26 in DSD 106, which may be part of the source code file. As noted above with reference to FIG. 1, the function logs are a data structure that may either be separately stored for each function, or may be combined into a single data structure including data structures for respective functions.

Figure 5:
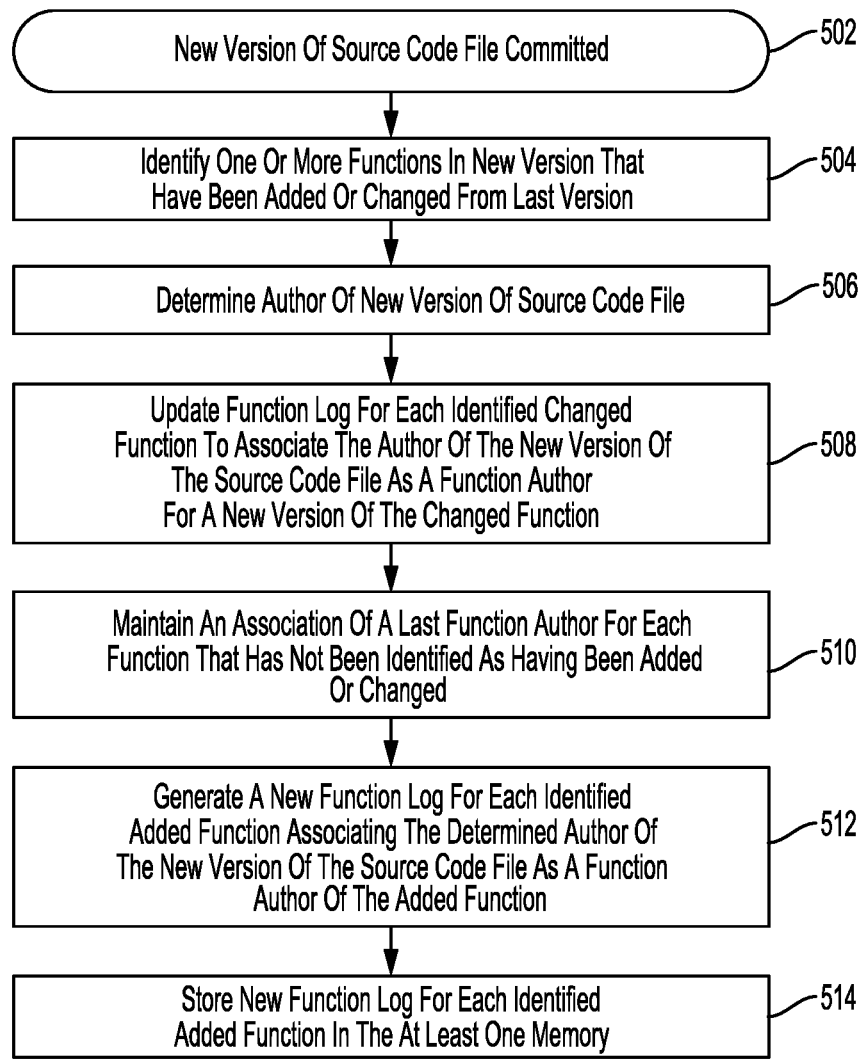
FIG. 5 is a flowchart for a function log update process according to an embodiment.

FIG. 5 is a flowchart for a function log update process according to an embodiment. The process of FIG. 5 may be performed by a processor, such as CPU 108 in FIG. 1, executing CMS 10.

In block 502, a new version of a source code file is committed to at least one memory. This may occur when the same or a different user has made changes to a source code file and then saves or commits the source code file to a local repository or to a remote repository.

In block 504, CMS 10 identifies one or more functions in the new version of the source code file that have been added or changed from the last version of the source code file. As discussed in more detail below with reference to the function log update sub-process of FIG. 6 and the function log generation process of FIG. 7, the identification of one or more functions that have been added or changed can be performed by comparing a list of FIDs from the previous version with the FIDs generated for the new version using FID generator 14. The FIDs for the previous version may be included with the source code file or stored as part of its function logs. In another implementation, the one or more functions that have been added or changed can be identified by comparing function prototypes output from parser 12 with function prototypes included in function logs for the file.

In block 506, CMS 10 determines an author of the new version of the source code file. In some implementations, CMS 10 may access from at least one memory an indication of an author of the new version of the source code file. The indication of the author may be included with a source code file log included with the file or stored apart from the file. CMS 10 in block 506 may access a source code file log 24 from a repository stored in a local memory or a remote memory, such as from a server storing repository 40 in FIG. 2.

With reference to the example source code file log of FIG. 12, the author of the second version of the source code file is Jack, and the author of the third version of the source code file is Mary. In block 508 of FIG. 5, function log generator 18 or another portion of CMS 10 updates the function log for each identified changed function to associate the author of the new version as the function author for the new version of the function. With reference to the example function logs of FIG. 14, a second version of the source code file from FIG. 11B is shown in the middle portion of the function logs as file version v2. As shown in FIG. 14, there are three functions in the second version of the file that have been identified with FID_1, FID_2, and FID_3. Since the function associated with FID_1 has been changed in the second version and the function associated with FID_3 has been newly added in the second version, the function author for both functions in the second version is Jack at timestamp TS2. This corresponds to the author of the second version of the source code file in the source code file log in FIG. 12.

Similarly, the function authors for the third version of the file toward the bottom of FIG. 14 include Mary at TS3 for FID_1, Tom at TS1 for FID_2, and Jack at TS2 for FID_3. This corresponds to the file shown in FIG. 11C where Mary has moved the function corresponding to FID_1 out of the file, but the other two functions corresponding to FID_2 and FID_3 have been left from the previous version of the file shown in FIG. 11B. Such function level tracking of changes and the authors making the changes improves the ability to determine who made what changes, and when they were made for a particular function.

Returning to the process of FIG. 5, function log generator 18 in block 510 maintains an association of a last function author in a respective function log for each function that has not been identified as having been added or changed. In the example function log of FIG. 14, the function associated with FID_2 does not change from the initial version of the file. The function author for FID 2 therefore remains as Tom from the first version through the third version of the source code file.

In block 512 of FIG. 5, function log generator 18 generates a new function log for each identified added function associating the author of the new version of the source code file as the function author for the newly added function. As noted above, in the example function log of FIG. 14, a new function log was generated for FID_3 in version 2, with Jack indicated as the function author since the third function was newly added in version 2. This newly added third function corresponds to the printProduct function at lines 15 to 18 of FIG. 11B.

In block 514 of FIG. 5, a new function log for each identified added function is stored in at least one memory. The new function log can be stored in a repository at a local memory, such as in DSD 106, or the new function log can be stored in a remote repository at a remote memory.

Figure 6:
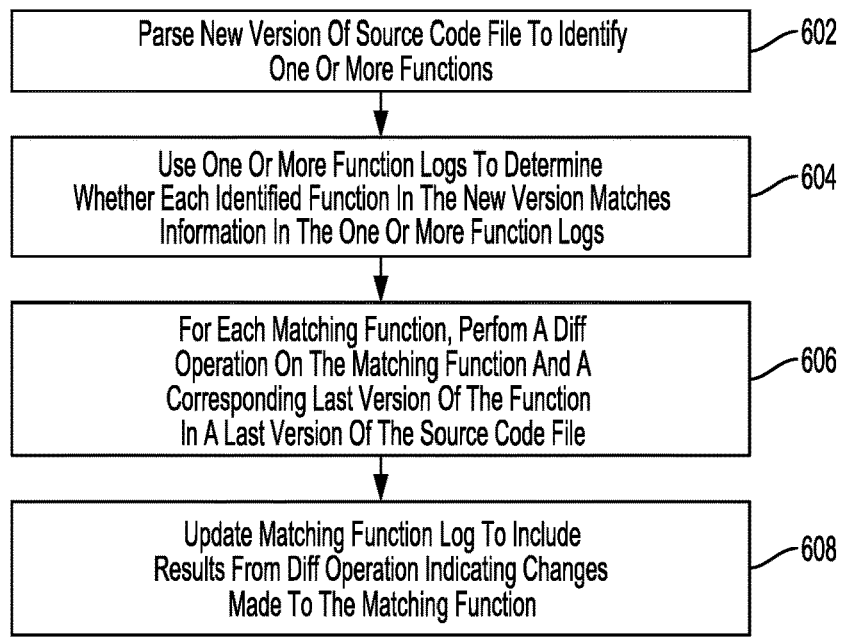
FIG. 6 is a flowchart for a function log update sub-process according to an embodiment.

FIG. 6 is a flowchart for a function log update sub-process according to an embodiment. The sub-process of FIG. 6 may, for example, be performed as part of blocks 504 to 508 in FIG. 5. A processor, such as CPU 108 in FIG. 1, may perform the sub-process of FIG. 6 by executing CMS 10.

In block 602, parser 12 parses a new version of a source code file to identify one or more functions. As discussed above, parser 12 may output a list of functions or a list of function prototypes that include information about the identified functions. The function prototypes may include information about the functions such as a function name, a function return type, a number of parameters, an order of parameters, and/or a rank for the function in terms of its order of appearance in the file as compared to other similar functions in terms of a function prototype or function name.

In block 604, CMS 10 uses one or more function logs (e.g., function logs 26 in FIG. 1) to determine whether each identified function in the new version matches information in the one or more function logs. In some implementations, the information from the function logs can include FIDs for the functions. As discussed above, the FIDs can provide a way of distinctly identifying functions across different versions of the file. In other implementations, different or additional information from the function logs may be used to identify the functions, such as the start and end lines of the function, the function name, the function rank, a return type for the function, or information relating to the parameters used by the function, such as the number of parameters, order of parameters, names of parameters, or type of parameters.

In block 606, function log generator 18 performs a diff operation for each matching function on the matching function and a corresponding last version of the function in the last version of the source code file. The diff operation may make a line by line comparison of the previous version of the function with the new version of the function.

In other implementations where only an indication of whether or not a change was made to the function is provided in the function log, function log generator 18 may first compare the start and end lines from the function log for each matching function to determine whether the number of lines for the function has changed. In such implementations, the diff operation of block 606 can be avoided in cases where the number of lines in the function has changed since this indicates a change has been made to the function without having to perform the diff operation. This can save time and processing resources for implementations where only an indication of whether or not the function has been changed is provided in the function log. For matching functions that have the same number of lines, the diff operation is performed to definitely determine whether changes have been made, even though the number of lines for the function has not changed.

In block 608, function log generator 18 updates the matching function log to include the results from the diff operation indicating changes made to the matching function. As shown in the example function logs of FIG. 14, these changes may be made with indications of lines that have been added to the function and lines that have been removed from the function since the last version of the function. In cases where there are no changes resulting from the diff operation between the new version of the function and the last version of the function, no changes are indicated in the function log.

By identifying matching functions between file versions, it is ordinarily possible to avoid having to perform a diff operation on an entire file. This can reduce the time it takes to identify changes. In addition, the use of unique FIDs or other ways of identifying functions across different versions of the file allow for the diff operation to be performed by CMS 10 without requiring a user to manually track functions from across different versions of the file. This can further reduce the time to identify changes, and make the identification of changes more accurate and reliable. For example, a user who wants to track changes made to a certain function in a file when using a conventional CMS may need to copy or extract the function from two versions of the file so that the versions of the function can be compared in isolation. As noted above, identifying the same function, the changes made to the function, or the author responsible for changes to the function from one version of a file to another version of the file or in a different file can be difficult and tedious when using conventional CMS.

Figure 7:
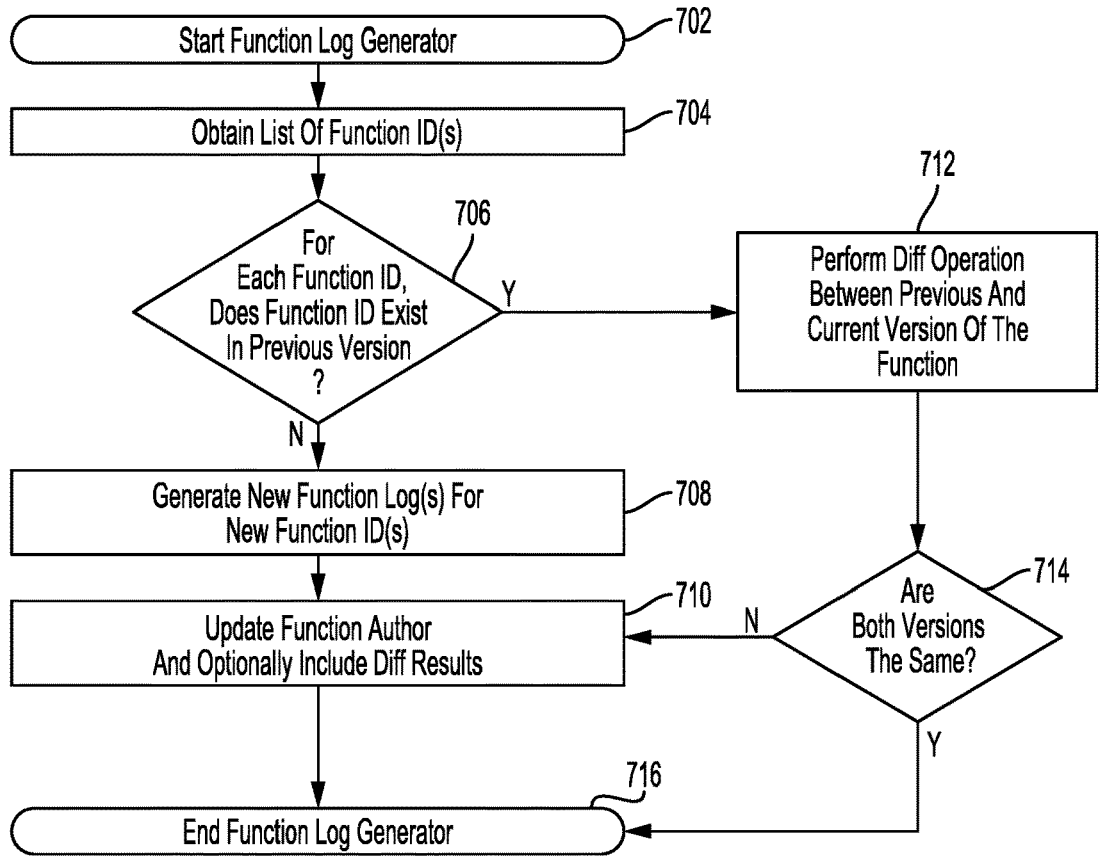
FIG. 7 is a function log generation process for new functions added to a file according to an embodiment.

FIG. 7 is a function log generation process for new functions added to a file according to an embodiment. The process of FIG. 7 can be performed by a processor, such as CPU 108 in FIG. 1, when executing CMS 10.

In block 702, function log generator 18 is started. The starting of function log generator 18 may be in response to the completion of parsing a file, as in block 602 of FIG. 6, or the completion of the identification of functions by parser 12 as in block 504 of FIG. 5.

In block 704, function log generator 18 obtains a list of FIDs that are included in the source code file. In this regard, each version of the source code file in some implementations may include a list of all of the FIDs for functions included in that version of the source code file. In such an implementation, if a file is deleted, all of its FIDs are deleted. If a file is moved, then all of its FIDs are also moved with the file. Adding a new file in such implementations creates a new list of FIDs for the functions in the new file. In other implementations, the FIDs may be obtained from a different location, such as from function logs stored outside of the source code file.

In block 706, function log generator 18 determines for each FID obtained in block 704 whether the FID exists in the previous version. If not, function log generator 18 generates a new function log in block 708 for each of the new FIDs. In block 710, function log generator 18 updates the function author in the function logs for the new functions to match the author indicated for the new version of the source code file.

If it is determined in block 706 that one or more of the FIDs in the new version of the file existed in the old version of the file, function log generator 18 performs a diff operation in block 712 between the previous version and the current version of the function. The diff operation may make a line by line comparison between the versions of the function.

In block 714, function log generator 18 determines whether both versions of the function are the same based on the results of the diff operation performed in block 712. If it is determined that the versions are not the same, function log generator 18 in block 710 updates the function log author for the new version of the function using the indication of the author for the new version of the file. In addition, function log generator 18 may also update the function log to include the diff results from the diff operation performed in block 712. The process of FIG. 7 then ends in block 716.

Figure 8:
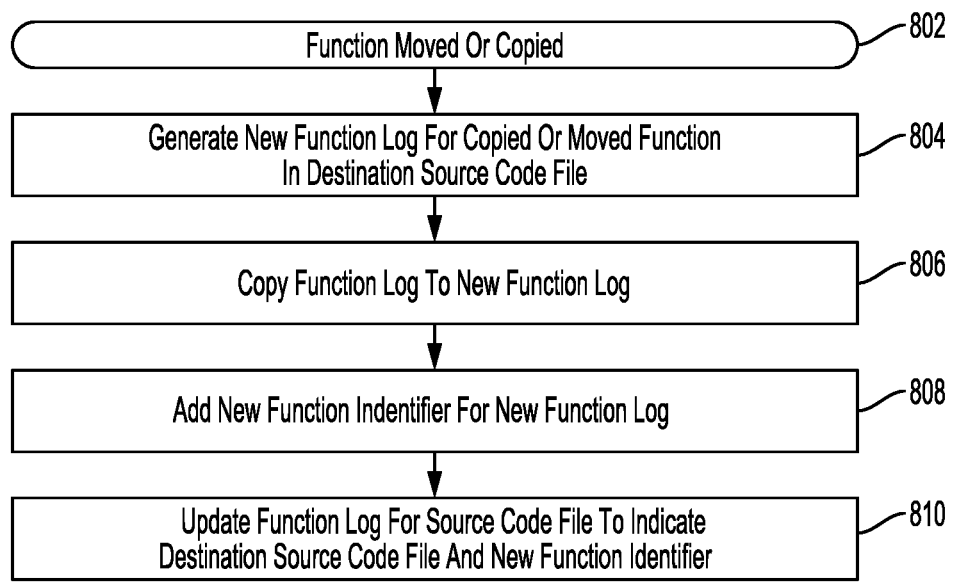
FIG. 8 is a flowchart for a function move or function copy process according to an embodiment.
Figure 9:
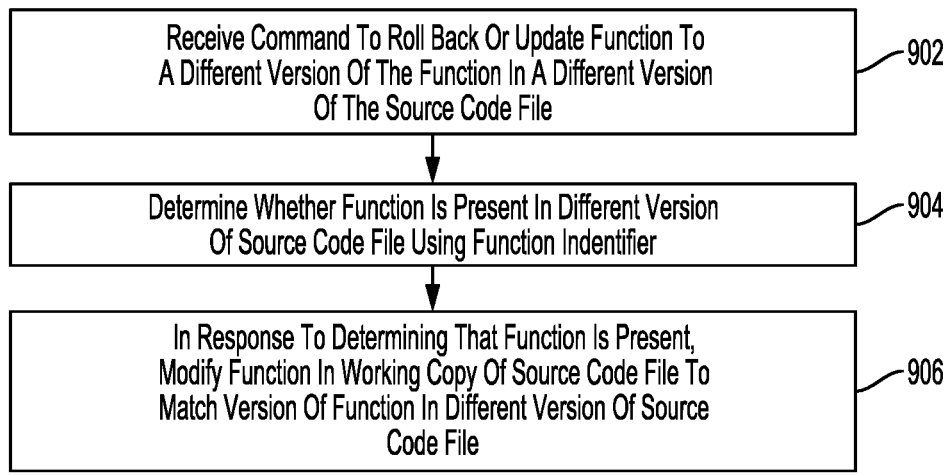
FIG. 9 is a flowchart for a function roll back or function update process according to an embodiment.
Figure 10:
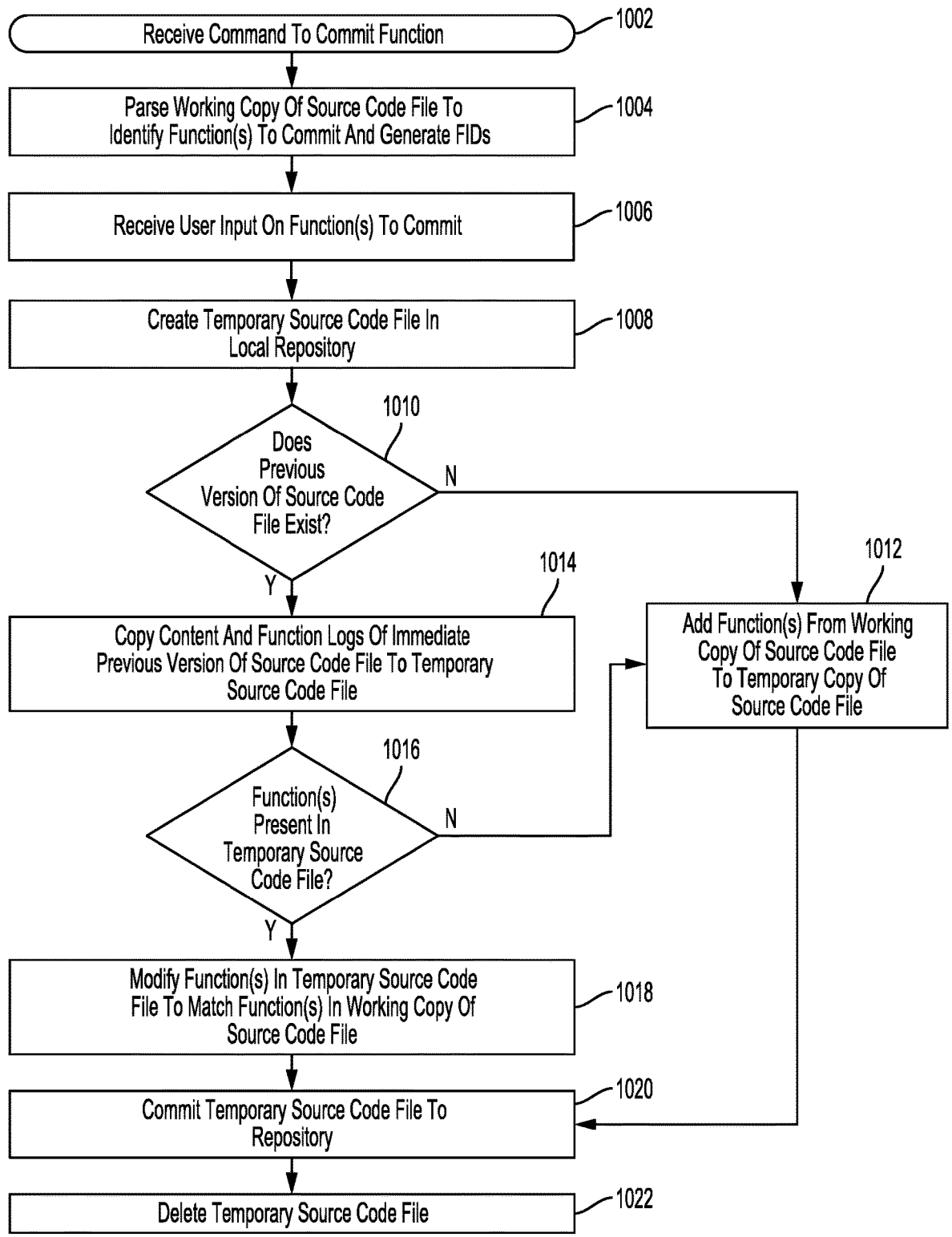
FIG. 10 is a flowchart for a function commit process according to an embodiment.

The processes described below for FIGS. 8 to 10 provide for function-level operations as compared to the file-level operations performed by conventional CMS. By providing function level operations such as function copy, function move, function roll back, function update, and function commit, it is ordinarily possible to improve the operation and functionality of CMS. For example, a particular function can be copied or moved from one file to another, while still maintaining a history or function log of changes made to the function before it was copied or moved. In another example, one or more functions can be rolled back or updated independently from other functions or other portions of a file. In yet another example, one or more functions may be selectively committed by a user to a repository without committing other portions of a working copy of the file.

FIG. 8 is a flowchart for a function move or function copy process according to an embodiment. The process of FIG. 8 may be performed by a processor, such as CPU 108 in FIG. 1, executing CMS 10.

In block 802, a function is moved or copied from one source code file to another source code file. In performing a function move or function copy operation, a user of CMS 10 may provide an FID for the function to be moved or copied and an indication of the destination file where the function is to be moved or copied to. In some implementations, the indication of the destination file can include a path where the file is stored or its file name.

Some implementations may require that the function being moved or copied already has a function log or an FID to enable moving or copying of the function. This can mean that a newly introduced function in a working copy of the file that has not yet been committed to a repository cannot be moved or copied until after it has been committed. In addition, performing a move or copy of a function may also cause one or both of the source file and the destination file to be committed to the repository.

In block 804, function log generator 18 generates a new function log for the copied or moved function in the destination source code file. In block 806, the function log of the moved or copied function is copied to the new function log generated in block 804. In implementations where the function logs are included in the source code file, the function log may be copied from the original source code file into the new function log generated in the destination source code file.

Copying the function log from the source file to the destination file for a moved or copied function can allow for the tracking of changes made to the function before the function was added to the destination file. This can provide better tracking of changes from one file to another than the tracking provided by conventional CMS.

In block 808, a new FID is added to the new function log corresponding to the moved or copied function. FID generator 14 may generate the new FID using the file path for the destination file and the function prototype for the function or other information pertaining to the moved or copied function. In some implementations, this can include deriving a hash value as a unique FID for the moved or copied function in the destination file from the file path for the destination file and the information for the function.

In block 810, function log generator 18 updates the function log in the source file to indicate the destination file and the new FID for the function in the destination file. This can provide further tracking of the function beyond the current source code file by allowing a user to follow changes made to the function in the destination file.

With reference to the example function logs of FIG. 14, the third version of the source code file of FIG. 11C includes a function log for FID_1 that indicates that the function has been moved to a different file. As shown in the bottom portion of FIG. 14, a third version of the function corresponding to FID_1 has been moved by Mary at timestamp TS3. All of the lines of the function are indicated as having been removed in the function code changes column. The additional logs column indicates a move operation, a destination file of sumCalculation.c, and a destination FID of FID_5.

FIGS. 15A and 15B show the destination source code file before and after the function has been moved into the destination source code file. Lines 11 to 16 of FIG. 15B show the addition of the printSum function moved from lines 5 to 10 of the source file in FIG. 11B. FIG. 16 shows the function logs for the destination source code file after the function has been added to the destination source code file. As shown in FIG. 16, the second version of the file includes an entry for the newly added function identified by FID_5 that was moved into the file by Mary at timestamp TS5. The function code changes column shows the addition of the lines of code for the moved function, and the additional logs column indicates that a move operation was performed on the function associated with FID_1 in the source file.

In addition, the function log in FIG. 16 for the moved function includes a copy of the function log for the function before it was moved. FIG. 17 provides an example of the copied log, which shows the changes that were made to the moved function in the source file, indications of the authors who made the changes, and timestamps indicating when the changes were made.

In cases where a function is copied instead of moved, the example function logs of FIGS. 14 and 16 may only differ by indicating a copy operation instead of a move operation in the additional logs column, and no removal of lines of code in the function code changes column of FIG. 14 for the third version of FID_1, since the copied function remains in the source file.

FIG. 9 is a flowchart for a function roll back or function update process according to an embodiment. The process of FIG. 9 may be performed by a processor, such as CPU 108 in FIG. 1, executing CMS 10.

In block 902, CMS 10 receives a command to roll back or update a function to a different version of the function found in a different version of the source code file. CMS 10 may then associate the function with its FID and identify the version of the source code file to which the function should be updated or rolled back to.

In block 904, CMS 10 determines whether the function is present in the different version of the source code file using the FID. As discussed above, each version of the source code file may include a list of FIDs corresponding to functions that appear in the source code file. In other implementations, a list of FIDs may be checked in a data structure outside of the source code file, or a different identifier of the functions present in the version of the source code file may be checked, such as the function prototypes in function logs.

In response to determining that the function is present in the different version of the source code file, CMS 10 in block 906 modifies the function in a working copy of the source code file to match the version of the function in the different version of the source code file. This can include replacing all or some of the lines of code for the function in the current version with lines of code for the function in the different version. These changes may be recorded under a function code changes section of a function log, together with an indication of the author performing the function roll back or function update operation and a timestamp indicating when the operation was performed. In some implementations, the function roll back or function update operation may also be noted in the additional logs section of the function log. Upon completion of the function roll back or function update operation, the working copy of the source code file may be committed to the repository.

FIG. 10 is a flowchart for a function commit process according to an embodiment. The process of FIG. 10 may be performed by a processor, such as CPU 108 in FIG. 1, executing CMS 10

In block 1002, CMS 10 receives a command to commit a function in a working copy of a source code file. The command may include the file name for the working copy. The working copy of the source code file may be stored in a temporary storage location, such as RAM 110 in the example computer system of FIG. 1, or in a memory of DSD 106 allocated for storing temporary data or frequently modified data. The working copy of the source code file can record changes made to the source code file during a session when the user is working on the file. Since some of the functions may have been newly added in the current session of the working copy, such functions may not have an FID yet. As described below, the process of FIG. 10 can allow users to commit a particular function or functions to the repository without having to commit the entire file.

In block 1004, parser 12 parses the working copy of the source code file to identify the function or functions to commit. Parser 12 may use one or more programming libraries as discussed above to identify functions and provide a function prototype for each identified function. FID generator 14 may then generate an FID for each function identified in the working copy of the source code file. The FID can be derived as a hash value from a file name or absolute path for the source code file previously committed in the repository or for the working copy, and the function prototype or other information about the function. In such implementations, a new source code file is first committed to create a new file name or a new absolute path for the new source code file before deriving the FID using the new file name or the new absolute path.

In block 1006, CMS 10 receives an input from the user indicating the function or functions to be committed. In some implementations, CMS 10 may provide the user via a display device (e.g., display device 103 in FIG. 1) a list of FIDs or other indication of each identified function. The input in block 1006 may be received via an input device (e.g., input device 102 in FIG. 1).

In block 1008, CMS 10 creates a temporary source code file in a local repository by copying the working copy of the source code file. In some cases, the temporary source code file may be located in the same memory for temporary storage as the working copy. With reference to the example computer system of FIG. 1, the temporary memory can be, for example, RAM 110, or a portion of DSD 106 allocated for temporary storage or for data that may be frequently modified.

In block 1010, CMS 10 determines whether a previous version of the source code file exists. CMS 10 may check a repository, such as repository 20 in FIG. 1 and/or repository 40 in FIG. 2 for a committed copy of the file.

If it is determined in block 1010 that a previous version of the source code file does not exist, CMS 10 adds the function or functions to be committed to the temporary copy of the source code file. If it is determined in block 1010 that a previous version of the file exists, CMS 10 in block 1014 copies the content and function logs of the immediately previous version of the source code file to the temporary source code file.

In block 1016, CMS 10 determines whether the function or functions to be committed are in the temporary source code file having the copied content and function logs from block 1014. This can involve comparing the FID or FIDs for the functions to be committed to the FIDs included in the copied function logs. If it is determined in block 1016 that the function or functions to be committed are not in the temporary source code file, the process proceeds to block 1012 to add the missing function or functions from the working copy to the temporary copy of the source code file.

If it is determined in block 1016 that the function or functions to be committed are present in the temporary source code file, CMS 10 in block 1018 modifies these functions in the temporary source code file to match the function or functions in the working copy of the source code file if the functions are different. This can include replacing some or all of the lines of code for the function or functions in the temporary file with lines of code for these functions in the working copy.

In some cases, some newly added functions may not be present in the temporary source code file in block 1016, while other functions to be committed may have been in the previous version. In such cases, the functions determined not to be present are added in block 1012 and the functions determined to be present are modified if needed in block 1018.

In block 1020, CMS 10 commits the temporary source code file to a permanent repository, which can include a remote repository such as repository 40 in FIG. 2. Committing the temporary source code file can create a new version of the source code file, which may trigger a function log update process such as the process of FIG. 5 discussed above. The temporary source code file is then deleted or marked for deletion in block 1022.

The foregoing function commit process can ordinarily allow for users to selectively commit particular functions, while leaving all other changes as-is in the working copy without committing them. This can help users back up or save particular functions and continue to make changes to the working copy of the file. In distributed or client-server environments, the time to commit a source code file to a remote repository may cause delay for the user. By only committing particular functions, the time to commit a file to a remote repository is typically reduced.

In addition, the tracking of changes at a function level rather than at a file level ordinarily provides an improved way for users to collaborate and work on source code files that is quicker and less prone to errors due to relying on users to manually follow different versions of a function across file versions. The above described function logs also improve the ability of CMS to identify authors who made certain changes to a function.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an SoC, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A method for tracking a function in a source code file, the method comprising:
   determining an author committing a new version of the source code file;
   identifying one or more changed functions in the new version of the source code file that have been changed from a last version of the source code file by:
      parsing the source code file to identify one or more functions in the new version of the source code file;
      generating a unique function identifier for each identified function;
      comparing each generated unique function identifier to previously generated unique function identifiers for the last version of the source code file; and
      in response to each matching unique function identifier generated for the identified one or more functions in the new version of the source code file, comparing contents of the identified function corresponding to the matching unique function identifier in the new version of the source code file with contents of a last version of the identified function in the last version of the source code file corresponding to the matching unique function identifier to determine whether the identified function has changed; and
   updating a data structure for each identified changed function to associate the determined author of the new version of the source code file as a function author for the identified changed function, wherein the data structure tracks function authors that have made changes at a function level.

2. The method of claim 1, wherein the unique function identifier is generated as a hash value derived from at least one of a path where the source code file is stored, a function name, a function return type, a number of function parameters, and an order of parameters in the function.

3. The method of claim 1, further comprising:
   for each identified function corresponding to the matching unique function identifier, comparing a line count for the identified function from the last version of the source code file to a line count for the identified function in the new version of the source code file to determine if the respective line counts match; and
   in response to determining that the respective line counts do not match, updating the data structure for the identified function to indicate a change from the last version of the function in the last version of the source code file.

4. The method of claim 1, further comprising:
   for each identified function corresponding to the matching unique function identifier, performing a diff operation on the identified function in the new version of the source code file and the last version of the function in the last version of the source code file; and
   updating the data structure to include the results from the diff operation indicating changes made to the identified function since the last version of the function.

5. The method of claim 1, wherein the data structure further includes at least one of the unique function identifier uniquely identifying the function, an indication of a time a version of the function was committed to at least one memory, and an indication of a version of the source code file where a current version of the function appears.

6. The method of claim 1, wherein a plurality of separate data structures is generated for respective functions or a combined data structure is generated including the plurality of data structures for respective functions.

7. The method of claim 1, wherein in response to moving or copying a function to a destination source code file, the method further comprises:
  generating a new data structure for the copied or moved function in the destination source code file;
  copying a data structure for the copied or moved function to the new data structure for the destination source code file; and
  adding a new unique function identifier for the new data structure corresponding to the copied or moved function in the destination source code file.

8. The method of claim 1, wherein in response to moving or copying a function to a destination source code file, the method further comprises:
  updating a data structure for the source code file corresponding to the copied or moved function to indicate the destination source code file and a new unique function identifier for a new data structure corresponding to the copied or moved function in the destination source code file.

9. The method of claim 1, further comprising:
  receiving a command to roll back or update a function to a different version of the function in a different version of the source code file;
  determining whether the function is present in the different version of the source code file using a unique function identifier for the function; and
  in response to determining that the function is present in the different version of the source code file, modifying the function in a working copy of the source code file to match the different version of the function in the different version of the source code file.

10. A computer system, comprising:
  at least one memory for storing a source code file; and
  at least one processor configured to:
    determine an author committing a new version of the source code file;
    identify one or more changed functions in the new version of the source code file that have been changed from a last version of the source code file by:
      parsing the source code file to identify one or more functions in the new version of the source code file;
      generating a unique function identifier for each identified function;
      comparing each generated unique function identifier to previously generated unique function identifiers for the last version of the source code file; and
      in response to each matching unique function identifier generated for the identified one or more functions in the new version of the source code file, comparing contents of the identified function corresponding to the matching unique function identifier in the new version of the source code file with contents of a last version of the identified function in the last version of the source code file corresponding to the matching unique function identifier to determine whether the identified function has changed; and
    update a data structure for each identified changed function to associate the determined author of the new version of the source code file as a function author for the identified changed function, wherein the data structure tracks function authors that have made changes at a function level.

11. The computer system of claim 10, wherein the unique function identifier is generated as a hash value derived from at least one of a path where the source code file is stored, a function name, a function return type, a number of function parameters, and an order of parameters in the function.

12. The computer system of claim 10, wherein the at least one processor is further configured to:
  for each identified function corresponding to the matching unique function identifier, compare a line count for the identified function from the last version of the source code file to a line count for the identified function in the new version of the source code file to determine if the respective line counts match; and
  in response to determining that the respective line counts do not match, update the data structure for the identified function to indicate a change from the last version of the function in the last version of the source code file.

13. The computer system of claim 10, wherein the at least one processor is further configured to:
  for each identified function corresponding to the matching unique function identifier, perform a diff operation on the identified function in the new version of the source code file and the last version of the function in the last version of the source code file; and
  update the data structure to include the results from the diff operation indicating changes made to the identified function since the last version of the function.

14. The computer system of claim 10, wherein the data structure further includes at least one of the unique function identifier uniquely identifying the function, an indication of a time a version of the function was committed to the at least one memory, and an indication of a version of the source code file where a current version of the function appears.

15. The computer system of claim 10, wherein a plurality of separate data structures is generated for respective functions or a combined data structure is generated including the plurality of data structures for respective functions.

16. The computer system of claim 10, wherein in response to moving or copying a function to a destination source code file, the at least one processor is further configured to:
  generate a new data structure for the copied or moved function in the destination source code file;
  copy a data structure for the copied or moved function to the new data structure for the destination source code file; and
  add a new unique function identifier for the new data structure corresponding to the copied or moved function in the destination source code file.

17. The computer system of claim 10, wherein in response to moving or copying a function to a destination source code file, the at least one processor is further configured to:
  update a data structure for the source code file corresponding to the copied or moved function to indicate the destination source code file and a new unique function identifier for a data structure corresponding to the copied or moved function in the destination source code file.

18. The computer system of claim 10, wherein the at least one processor is further configured to:
  receive a command to roll back or update a function to a different version of the function in a different version of the source code file;
  determine whether the function is present in the different version of the source code file using a unique function identifier for the function; and
  if the function is present in the different version of the source code file, modify the function in a working copy of the source code file to match the different version of the function in the different version of the source code file.

19. A computer-readable storage medium storing computer-executable instructions for tracking a function in a source code file, wherein when the computer-executable instructions are executed by at least one processor, the computer-executable instructions cause the at least one processor to:
  determine an author committing a new version of the source code file;
  identify one or more changed functions in the new version of the source code file that have been changed from a last version of the source code file by:
    parsing the source code file to identify one or more functions in the new version of the source code file;
    generating a unique function identifier for each identified function;
    comparing each generated unique function identifier to previously generated unique function identifiers for the last version of the source code file; and
    in response to each matching unique function identifier generated for the identified one or more functions in the new version of the source code file, comparing contents of the identified function corresponding to the matching unique function identifier in the new version of the source code file with contents of a last version of the identified function in the last version of the source code file corresponding to the matching unique function identifier to determine whether the identified function has changed; and
  update a data structure for each identified changed function to associate the determined author of the new version of the source code file as a function author for the identified changed function, wherein the data structure tracks function authors that have made changes at a function level.

20. The computer-readable storage medium of claim 19, wherein the unique function identifier is generated as a hash value from at least one of a path where the source code file is stored, a function name, a function return type, a number of function parameters, and an order of parameters in the function.

* * * * *